(12) United States Patent
Coullard et al.

(10) Patent No.: US 10,759,429 B2
(45) Date of Patent: Sep. 1, 2020

(54) HYDRAULIC ROLL-OFF PROTECTION

(71) Applicant: Continental Automotive Systems, Inc., Auburn Hills, MI (US)

(72) Inventors: Bryan Coullard, Sault Ste. Marie, MI (US); Lance Brown, Sault Ste. Marie, MI (US); Benjamin Nathan Mikel, Brimley, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 183 days.

(21) Appl. No.: 16/115,092

(22) Filed: Aug. 28, 2018

(65) Prior Publication Data

US 2019/0071090 A1    Mar. 7, 2019

Related U.S. Application Data

(60) Provisional application No. 62/554,824, filed on Sep. 6, 2017.

(51) Int. Cl.
*B60W 30/18* (2012.01)
*B60W 40/10* (2012.01)

(52) U.S. Cl.
CPC ...... *B60W 30/18118* (2013.01); *B60W 40/10* (2013.01); *B60W 2510/101* (2013.01); *B60W 2510/186* (2013.01); *B60W 2520/28* (2013.01); *B60W 2540/10* (2013.01); *B60W 2710/182* (2013.01)

(58) Field of Classification Search
CPC ..... B60W 2510/101; B60W 2510/186; B60W 2520/28; B60W 2540/10; B60W 2710/182; B60W 30/18118; B60W 40/10; B60T 2201/06; B60T 7/122
See application file for complete search history.

(56) References Cited

U.S. PATENT DOCUMENTS

| | | | | |
|---|---|---|---|---|
| 4,561,527 A * | 12/1985 | Nakamoto | ........... | B60T 7/12 188/2 D |
| 5,139,315 A * | 8/1992 | Walenty | ........... | B60T 7/107 303/162 |
| 6,234,586 B1 * | 5/2001 | Davis | ........... | B60R 25/08 303/89 |
| 6,260,934 B1 * | 7/2001 | Lee | ........... | B60T 7/122 303/192 |
| 6,361,469 B1 * | 3/2002 | Roder | ........... | B60L 7/003 188/69 |
| 6,406,102 B1 * | 6/2002 | Arnold | ........... | B60T 7/042 303/20 |
| 7,681,961 B2 * | 3/2010 | Nonaga | ........... | B60T 13/746 188/162 |
| 9,643,609 B2 * | 5/2017 | Bureau | ........... | B60T 7/122 |

(Continued)

FOREIGN PATENT DOCUMENTS

| | | |
|---|---|---|
| EP | 2615853 A2 | 7/2013 |
| EP | 2978242 A1 | 1/2016 |
| WO | 0232356 A1 | 4/2002 |

*Primary Examiner* — Tyler J Lee

(57) ABSTRACT

"Roll-off" is considered to be any unwanted vehicle movement after a parking brake is engaged. Roll-off is prevented or reduced by a method and apparatus that adjusts hydraulic brake pressure applied to vehicle wheel brakes if unintended motion is detected when the parking brake is engaged and the vehicle's transmission is not in the park position.

9 Claims, 2 Drawing Sheets

(56) References Cited

U.S. PATENT DOCUMENTS

| | | | |
|---|---|---|---|
| 2002/0100647 A1* | 8/2002 | Miyakawa | B60T 13/746 188/162 |
| 2004/0113486 A1* | 6/2004 | Koga | B60T 13/66 303/20 |
| 2004/0113489 A1* | 6/2004 | Iwagawa | B60T 8/17616 303/155 |
| 2004/0226768 A1* | 11/2004 | DeLuca | B60T 7/12 180/275 |
| 2014/0039773 A1* | 2/2014 | Bureau | B60W 30/18054 701/70 |
| 2014/0294198 A1 | 10/2014 | Hall et al. | |
| 2018/0148020 A1* | 5/2018 | Baehrle-Miller | B60T 7/122 |

* cited by examiner

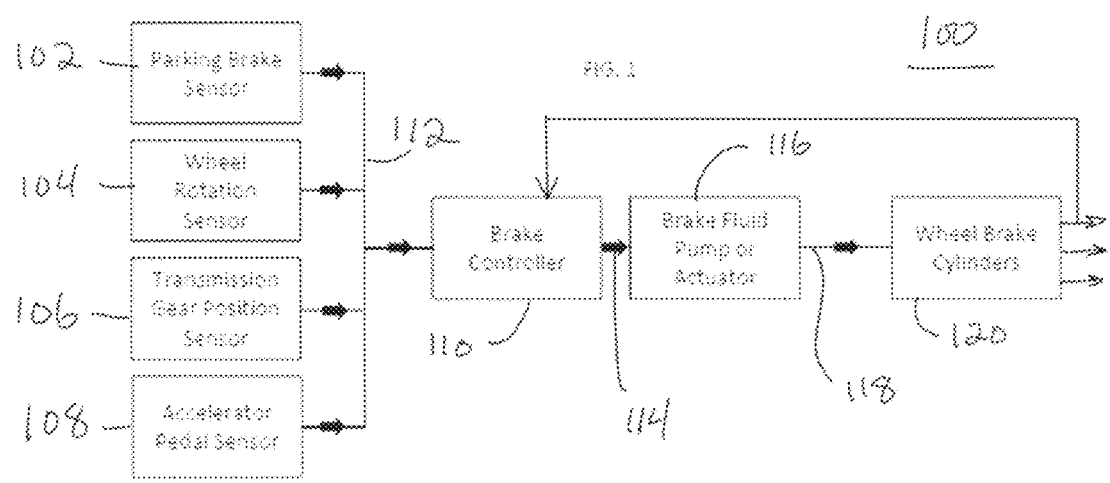

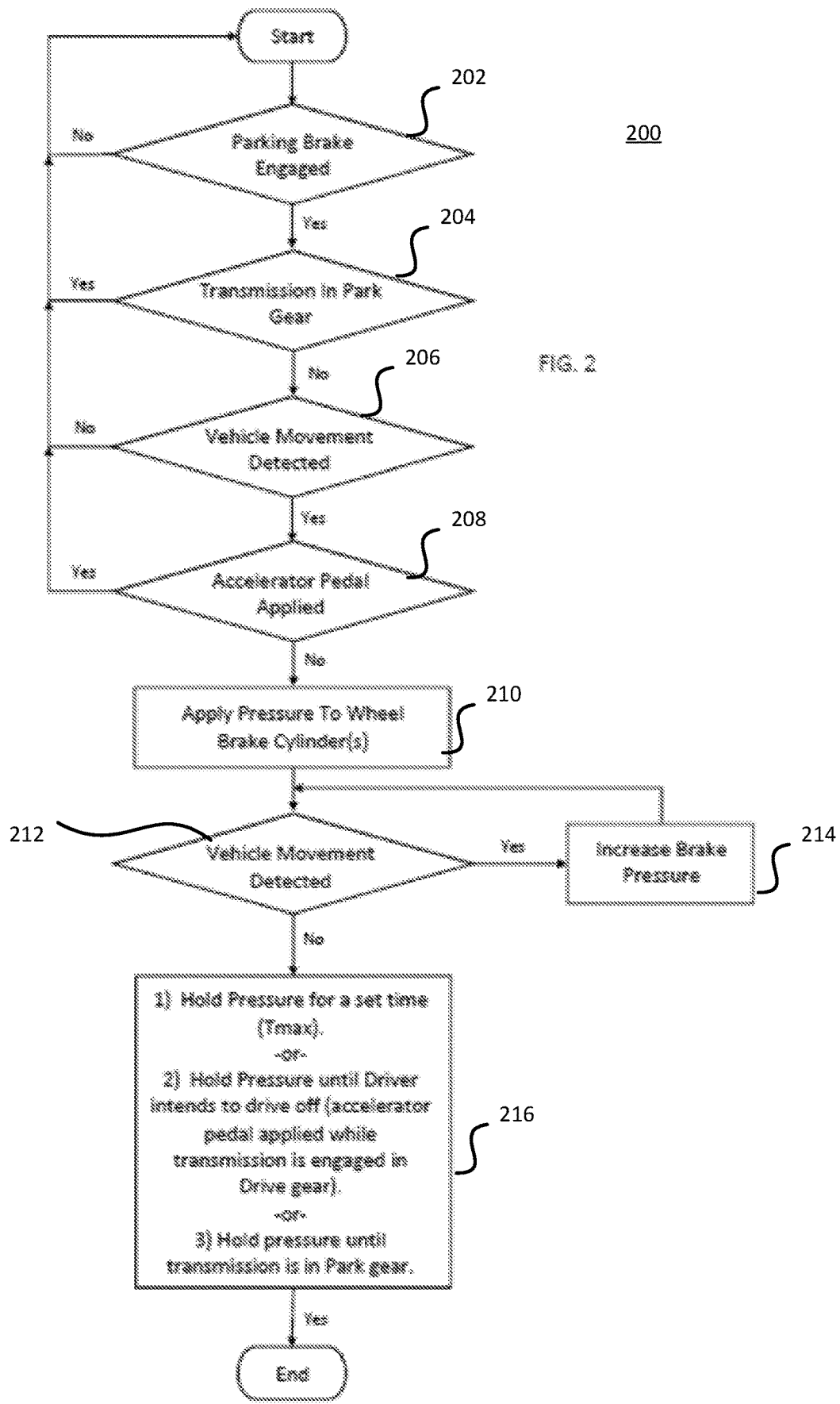

HYDRAULIC ROLL-OFF PROTECTION

BACKGROUND

It is well known that the parking brake of a motor vehicle is not always able to prevent the vehicle from moving when the parking brake is applied. A vehicle might, and can continue to roll after the parking brake is engaged if the transmission is left in its drive range and if for instance the parking brakes are worn, the engine idle speed is too high or the vehicle is on an incline. Unwanted vehicle movement after a parking brake is engaged is referred to herein as "roll-off." A method and apparatus for preventing it or protecting against it would be an improvement over the prior art.

BRIEF DESCRIPTION OF THE FIGURES

FIG. 1 is a block diagram of an apparatus for controlling vehicle roll-off; and

FIG. 2 is a flowchart depicting steps of a method of preventing roll-off of a vehicle having an automatic transmission, a parking brake, an accelerator pedal and hydraulically-operated wheel brakes.

DETAILED DESCRIPTION

FIG. 1 depicts an apparatus 100 for protecting against vehicle roll-off. The apparatus 100 comprises a parking brake sensor 102, a wheel rotation sensor 104, a transmission gear position sensor 106 and an accelerator pedal sensor 108. The four sensors 102, 104, 106 and 108 are all coupled into a brake controller 110 via a CAN bus 112.

The brake controller 110 is preferably embodied as a conventional prior art processor such as a microcontroller, microprocessor or even a DSP. An output 114 of the controller 110 which is coupled to an electrically-powered brake fluid pump, also known as a brake fluid actuator 116.

The brake fluid pump 116 is essentially an electrically-powered pump, preferably a positive displacement pump, which pumps hydraulic fluid. The pump 116 is configured to be able to modulate the output pressure responsive to a feedback signal.

As used herein, the term "real time" means the actual time during which something takes place.

The brake fluid pump 116 has an output port, from which hydraulic fluid is provided to at least the wheel brake cylinders 120 of the front wheels of vehicle. A portion of the brake fluid pump output 118 is also provided to a feedback loop 122 which provides to the brake controller 110, a real-time representation of the brake fluid pump pressure applied to the wheel brake cylinders 120. The feedback loop 122 thus enables the brake controller 110 to determine the output pressure of the brake fluid pump 118 nearly instantaneously and thus the pressure applied to the wheel brake cylinders 120.

The ability to measure or determine the pressure applied to the wheel brake cylinders is important because it allows the apparatus 100 to modulate the pressure applied to the wheel brake cylinders in order to stop wheel rotation as detected by the wheel rotation sensor 104. The apparatus 100 is thus able to dynamically adjust pressure applied to the wheel brakes in order to stop vehicle movement under different vehicle operating conditions.

FIG. 2 depicts steps of a method 200 for preventing vehicle roll-off. The method 200 is applicable to vehicles having an automatic transmission, a parking brake, an accelerator pedal and hydraulically-operated wheel brakes.

Those of ordinary skill in the art know that an automatic transmission has a park position, which typically locks one or more vehicle wheels to the transmission case. Automatic transmissions also have a "drive" and "reverse" position in which engine or motor torque is applied to the wheels. Automatic transmissions also typically have a "neutral" position.

A vehicle's "parking brake" is intended to hold the vehicle in place, i.e., prevent the vehicle wheels from rolling, when the operator is not in the vehicle. The parking brake is typically applied to only the rear wheel brakes, mostly because of cost constraints on manufacturers. Stated another way, most vehicle parking brakes cannot engage more than the rear wheel brakes and do not engage the front wheel brakes.

At a first step 202 the parking brake sensor 102 depicted in FIG. 1 determines whether the vehicle's parking brake is "engaged." Parking brake engagement can be determined or detected by a switch coupled to a conventional, cable-operated/controlled parking brake. Parking brake engagement detection can also be accomplished electronically in vehicles that have an electric parking brake or an electric integrated park brake. Regardless of the type of parking brake that a vehicle has, if a parking brake is determined to be engaged at step 202, the method 200 proceeds to step 204 where a determination is made whether the transmission is in the park position.

Determining whether an automatic transmission is in the park position is a straightforward matter. A switch can be mechanically coupled to the transmission shift linkage, electronic sensors in an engine control unit can also make a detection. Regardless of the mechanism by which the transmission park position is detected, if the transmission is not in the park position, the vehicle is at risk of roll-off. The method thus proceeds to step 206 where a determination is made whether vehicle movement is detected by one or more wheel rotation sensors.

Vehicle movement can be detected by a wheel rotation sensor 104 as shown in FIG. 1. Such sensors are commonly used in antilock braking systems and can also be used in the method depicted in FIG. 2. If vehicle movement is detected at step 206, after determining that the transmission is not in the park position and after determining that the parking brake is engaged, the next step of the method at step 208 is to determine whether the accelerator pedal is applied.

Accelerator pedal actuation is important to the method 200 because under certain circumstances, a driver might need or want to engage a parking brake, with the transmission in a drive range and then apply pedal pressure in order to move the vehicle under certain driving conditions. When such conditions exist, vehicle movement is actually desired; the method 200 thus returns to step 202 because the method 200 assumes that the driver is in control of the vehicle and wishes the vehicle to be able to move even though the parking brake is engaged.

Conversely, if at step 208 the accelerator pedal is determined to be not applied, the method proceeds to step 210 where brake pressure is applied to the wheel cylinders.

The application of hydraulic pressure to the wheel brake cylinders is applied by the brake controller 110 directing or controlling the brake fluid pump to increase the output pressure to the wheel brake cylinders 120. The method shown in FIG. 2 proceeds to step 212 where a second test of vehicle movement is made. If vehicle movement is detected at step 212 the method proceeds to step 214 where the pressure applied to the wheel cylinders is increased. The increase in brake pressure applied at step 214 is accomplished by the feedback loop 122 of the apparatus shown in FIG. 1. Those of ordinary skill in the art should recognize that the loop provided by steps 212 and 214 continues to increase brake pressure until detected vehicle movement ceases whereupon the method proceeds to step 216.

In a preferred embodiment, the initial amount of hydraulic pressure applied to the hydraulically-operated wheel brakes is an experimentally determined static pressure, the value of which will be dependent upon several factors, including the vehicle weight, type of brakes, road slope, engine and drive train components. As vehicle components and brakes in particular wear, the initial amount of hydraulic pressure might be inadequate to stop vehicle roll-off. The increasing hydraulic pressure can thus be provided either linearly or non-linearly until vehicle wheel rotation stops. In various alternate embodiments, the initial amount of hydraulic pressure applied at step 212 can be increased at step 214 and decreased based on max time, accelerator apply, or transmission shift to park at step 216. The brake pressure modulation can be either linearly or non-linearly or both.

The foregoing description is for purposes of illustration only. The true scope of the invention is set forth in the following claims.

What is claimed is:

1. A method of preventing roll-off of a vehicle having an automatic transmission, a parking brake, an accelerator pedal and hydraulically-operated wheel brakes, the method comprising:
   determining whether the vehicle's parking brake is engaged;
   determining whether the vehicle's automatic transmission is in the transmission's park position;
   detecting rotation of a vehicle wheel after determining that the vehicle's parking brake is engaged; and
   if the parking brake is engaged, the transmission is not in park and if wheel rotation is detected, applying an initial amount of hydraulic pressure to the hydraulically-operated wheel brakes; and
   modifying the initial amount of applied hydraulic pressure applied to the hydraulically-operated wheel brakes in real time until vehicle wheel rotation stops.

2. The method of claim 1, further comprising the step of:
   determining whether the accelerator is depressed after the step of detecting rotation; and
   wherein the step of applying an initial amount of hydraulic pressure to the hydraulically-operated wheel brakes if the parking brake is engaged, the transmission is not in park and if wheel rotation is detected comprises:
   applying the initial amount of hydraulic pressure to the hydraulically-operated wheel brakes if the accelerator pedal is not depressed.

3. The method of claim 1, wherein the step of applying an initial amount of hydraulic pressure to the hydraulically-operated wheel brakes comprises applying an initial amount of hydraulic pressure to hydraulically-operated front wheel brakes of the vehicle.

4. The method of claim 3, wherein the step of increasing the initial amount of applied hydraulic pressure includes the step of increasing the initial amount of applied hydraulic pressure continuously until vehicle wheel rotation stops.

5. The method of claim 3, wherein the step of increasing the initial amount of applied hydraulic pressure includes the step of increasing the initial amount of applied hydraulic pressure continuously and non-linearly until vehicle wheel rotation stops.

6. The method of claim 3, wherein the step of determining whether the vehicle's parking brake is engaged comprises detecting closure of a switch that is mechanically coupled to a parking brake actuation lever.

7. The method of claim 3, wherein the step of determining whether the vehicle's parking brake is engaged comprises detecting actuation of an electric parking brake.

8. An apparatus for controlling roll off in a vehicle having an automatic transmission, hydraulically operated wheel brakes and a parking brake, the apparatus comprising:
   a brake controller;
   a parking brake sensor coupled to the brake controller;
   a wheel rotation sensor coupled to the brake controller;
   a transmission gear position sensor coupled to the brake controller;
   an accelerator pedal sensor coupled to the brake controller;
   a brake fluid pump coupled to an output of the brake controller; and
   a plurality of wheel brake cylinders coupled to an output of the brake fluid pump; wherein, the brake controller is configured to cause the brake fluid pump to apply hydraulic pressure to the wheel brake cylinder responsive to:
   engagement of the parking brake;
   the transmission gear position not being in the park position;
   the accelerator pedal not being depressed;
   and detected vehicle wheel rotation.

9. The apparatus of claim 8, wherein the brake fluid pump and brake controller are configured to adjust pressure applied to the vehicle's brake cylinders in real time to stop vehicle wheel rotation.

* * * * *